United States Patent
Troxell (10) Patent No.: US 7,351,973 B2
(45) Date of Patent: Apr. 1, 2008

(54) APPARATUS AND METHOD FOR PROVIDING THERMAL CONDUCTANCE IN THERMALLY RESPONSIVE PHOTONIC IMAGING DEVICES

(75) Inventor: John R. Troxell, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/353,523

(22) Filed: Feb. 14, 2006

(65) Prior Publication Data
US 2006/0180758 A1   Aug. 17, 2006

Related U.S. Application Data

(60) Provisional application No. 60/653,266, filed on Feb. 15, 2005.

(51) Int. Cl.
*G01J 5/00* (2006.01)
(52) U.S. Cl. .................................. 250/338.1
(58) Field of Classification Search ............... 250/351, 250/350, 338.5, 338.4, 338.3, 338.2, 338.1
See application file for complete search history.

(56) References Cited

U.S. PATENT DOCUMENTS

| | | | |
|---|---|---|---|
| 5,486,698 A * | 1/1996 | Hanson et al. ............ 250/332 |
| 5,656,816 A * | 8/1997 | Tanaka .................. 250/339.01 |
| 5,933,277 A | 8/1999 | Troxell et al. ............ 359/573 |
| 5,953,161 A | 9/1999 | Troxell et al. ............ 359/618 |
| 6,294,784 B1 | 9/2001 | Schubring et al. ....... 250/338.3 |
| 6,300,554 B1 | 10/2001 | Du et al. .................... 136/201 |
| 6,339,221 B1 | 1/2002 | Schubring et al. ....... 250/338.3 |
| 6,782,357 B1 | 8/2004 | Goodman et al. ............ 704/9 |
| 2004/0129882 A1 | 7/2004 | Mashio et al. |

FOREIGN PATENT DOCUMENTS

WO   0208706   1/2002

OTHER PUBLICATIONS

European Search Report for 06075345.6 not a publication.

* cited by examiner

*Primary Examiner*—Constantine Hannaher
(74) *Attorney, Agent, or Firm*—Paul L. Marshall (57) ABSTRACT

Exemplary embodiments of the present invention are directed to a photonic sensor and method of operation, in one embodiment a photonic has: a sensing element; a dielectric layer; a first electrode disposed between the sensing element and the dielectric layer; a second electrode positioned in a facing spaced relationship with respect to the dielectric layer, the second electrode being disposed upon a substrate; and wherein an applied voltage between the first and second electrodes attracts the first electrode towards the second electrode resulting in a movement of the sensor and the first electrode and dielectric layer with respect to the second electrode, wherein a path of thermal conductance is provided between the substrate and the sensing element through the first electrode, the dielectric layer and the second electrode, and the dielectric layer and the first electrode return to the facing spaced relationship when the applied voltage is removed.

27 Claims, 6 Drawing Sheets

FIG. 16

APPARATUS AND METHOD FOR PROVIDING THERMAL CONDUCTANCE IN THERMALLY RESPONSIVE PHOTONIC IMAGING DEVICES

CROSS REFERENCE TO RELATED APPLICATIONS

The present application claims the benefit of U.S. provisional patent application Ser. No. 60/653,266, filed Feb. 15, 2005, the contents of which are incorporated herein by reference thereto.

TECHNICAL FIELD

This present invention relates generally to photonic sensing and imaging systems that employ thermal detection means and more specifically, the present invention relates to an apparatus and method for providing thermal conductance in a photonic imaging system.

BACKGROUND

Photonic sensors and imaging systems rely on two dominant classes of technology to detect photons; the first, generally referred to as "photoelectric" typically employs diode-like structures which rely on semiconductor material energy band gaps to define wavelength ranges of interest. The second class of detectors are typically referred to as "thermal detectors." The detectors typically detect incident radiation based upon the thermal heating of individual elements or pixels of an imaging array, wherein the absorbed radiation is converted to heat that subsequently produces a measured effect. Intrinsically, they tend to respond to all wavelengths. This class of photonic sensors includes bolometers, thermocouples, thermopiles, thermistors and pyroelectric materials, and generally makes use of materials that have one or more physical properties that respond in an exaggerated manner to changes in the temperature of that material. Although this class of sensors is responsive to photonic radiation of any wavelength, traditionally this class of sensors has been employed for the detection of infrared radiation, and consequently the elements of this class have been referred to as infrared sensors and imagers. They will be referred to as infrared sensors and imagers in this document.

The ability to accurately, reliably, and sensitively detect low levels of infrared radiation generally relies on the appropriate choice of sensor material properties. In particular, the heat capacity and the thermal conductance of each of the materials that comprise the sensor elements are carefully chosen, as are the thermal properties of adjacent materials that affect the flow of heat away from the sensing elements. For example, the thermal conductivity of air cannot be neglected, with the result that many thermal imaging systems are packaging in a vacuum enclosure. In order to obtain high detection sensitivity, it is generally desirable that the heat flow away from the individual sensor elements or pixels be relatively slow, and consequently efforts are made to minimize thermal conductance paths from the sensor elements to adjacent sensor elements and to substrate heatsinks. One of the means to achieve such reduced thermal conductance to the substrate is to employ the techniques of bulk or surface micromachining in order to remove substrate material from beneath the sensor elements so as to reduce the thermal conductance between the sensor element and the remaining substrate material. The thermal conductance of air, or of other gasses in this gap, is generally less than that of most solid materials. Further reductions in thermal conductance across this gap can be obtained by operating the sensing array in a vacuum environment. In particular, these techniques have been advantageously employed in the fabrication of arrays of microbolometers for imaging infrared radiation.

However, the speed of response of a thermal sensor is also related to the thermal conductance between the sensor element and the substrate or heatsink. A given sensor element can only respond to changes in incident radiation if the heat absorbed from the incident radiation can be dissipated to the substrate. Thus, in order to achieve adequate temporal response of a thermal sensor, it is desirable to increase the thermal conductance path between the active sensing element and the physical surrounding region or substrate.

Accordingly, it is desirable to provide a thermal imaging device or sensor element that address this simultaneous need for low thermal conductivity, in order to increase sensitivity, and high thermal conductivity, in order to increase sensor response speed.

Accordingly, it is desirable to provide an infrared imaging system, with a means for varying the paths of thermal conductance.

SUMMARY

Disclosed herein is a device and method for providing thermal conductance in an infrared imaging system employing sensing elements from the thermal sensor classes, wherein absorbed radiation is converted to heat which produces a measurable effect. In addition, an infrared imaging system utilizing such sensing elements is provided.

Exemplary embodiments of the present invention address the simultaneous need for low thermal conductivity, in order to increase sensitivity, and high thermal conductivity, in order to increase sensor response speed. Other exemplary embodiments are directed to apparatus, methods or means to change, or modulate the thermal conductance between a thermal sensing element and its substrate or reference heatsink at a known fixed or variable rate in order to increase the sensitivity of the sensing element by enabling the application of noise reduction techniques such as phase sensitive detection.

In an exemplary embodiment of the present invention, an infrared sensor is provided. The infrared sensor, comprising: a sensing element; a dielectric layer; a first electrode disposed between the sensing element and the dielectric layer; a second electrode positioned in a facing spaced relationship with respect to the dielectric layer, the second electrode being disposed upon a substrate; and wherein an applied voltage between the first and second electrodes attracts the first electrode towards the second electrode and the dielectric layer is drawn towards or alternatively makes contact with the second electrode, wherein a path of thermal conductance is provided between the substrate and the sensing element through the first electrode, the dielectric layer and the second electrode, and the dielectric layer and the first electrode return to the facing spaced relationship when the applied voltage is removed.

In another exemplary embodiment, a sensing array is provided, the sensing array comprising a plurality of sensing elements each sensing element, comprising: a dielectric layer; a first electrode disposed between the sensing element and the dielectric layer; a second electrode positioned in a facing spaced relationship with respect to the dielectric layer, the second electrode being disposed within a receiving area defined by a substrate, wherein a portion of the dielectric layer is supported by a periphery of the receiving area; and wherein an applied voltage attracts the first electrode towards the second electrode and the dielectric layer is drawn towards or alternatively makes contact with the second electrode, wherein a path of thermal conductance is provided to the substrate and wherein the first electrode returns the dielectric layer to the facing spaced relationship when the applied voltage is removed from the second electrode, wherein the array is configured to allow each sensing element to independently be moved towards the substrate.

A method of providing an intermittent thermal conductance path in an infrared sensor, comprising: disposing a sensing element on a first electrode, the first electrode being positioned on a dielectric layer; disposing a second electrode within a receiving area defined by a substrate, wherein a portion of the dielectric layer is supported by a periphery of the receiving area, wherein the second electrode is positioned in a facing spaced relationship with respect to the dielectric layer; and providing a thermal conductance path from the sensing element to the substrate by applying a voltage to the second electrode, wherein the first electrode is pulled towards the second electrode and wherein the first electrode and the dielectric layer return to the facing spaced relationship when the applied voltage is removed from the second electrode.

A method for providing an intermittent thermal conductance path in a thermal sensing array, the method comprising: disposing a plurality of sensing elements on a plurality of first electrodes, the plurality of first electrodes each being positioned on a respective one of a plurality of dielectric layers; disposing each of a plurality of second electrodes within a receiving area defined by a substrate, wherein a portion of each of the plurality of dielectric layers is supported by a periphery of the receiving area, wherein the plurality of second electrodes are positioned in a facing spaced relationship with respect to a respective one of the plurality of dielectric layers; and intermittingly providing an increased thermal conductance path between a first portion of the plurality of sensing elements and the substrate and a second portion of the plurality of sensing elements and the substrate, wherein the increased thermal conductance path between the first portion of the plurality of sensing elements and the substrate is provided through a first portion of the plurality of second electrodes by changing a voltage drop between a first portion of the plurality of first electrodes and the first portion of the plurality of second electrodes, wherein a distance between the first portion of the plurality of first electrodes and the first portion of the plurality of second electrodes decreases; and wherein the increased thermal conductance path between the second portion of the plurality of sensing elements and the substrate is provided through a second portion of the plurality of second electrodes by changing a voltage drop between a second portion of the plurality of first electrodes and the second portion of the plurality of second electrodes, wherein a distance between the second portion of the plurality of first electrodes and the second portion of the plurality of second electrodes decreases.

The above-described and other features of the present disclosure will be appreciated and understood by those skilled in the art from the following detailed description, drawings, and appended claims.

DESCRIPTION OF EXEMPLARY EMBODIMENTS

Disclosed herein is a method and apparatus for providing thermal conductance in a sensing element or plurality of sensing elements in an infrared imaging system. More specifically, an apparatus and method for satisfying the simultaneous need for low thermal conductivity, in order to increase sensitivity, and high thermal conductivity, in order to increase sensor response speed is provided. In addition, an apparatus, method or means to change, or modulate the thermal conductance between a thermal sensing element and its substrate or reference heatsink at a known fixed or variable rate in order to increase the sensitivity of the sensing element by enabling the application of noise reduction techniques such as phase sensitive detection is provided. In addition, an infrared imaging system utilizing a plurality of such sensing elements or pixels is provided.

This application is also related to United States provisional patent applications 60/653,261, filed Feb. 15, 2005 and 60/653,002, filed Feb. 15, 2005, the contents each of which are incorporated herein by reference thereto. In addition this application is also related to the following U.S. patent applications Ser. No. 11/353,561 filed Feb. 14, 2006 and Ser. No. 11/353,355 filed Feb. 14, 2006 and the contents each of which are incorporated herein by reference thereto.

Figure 1:
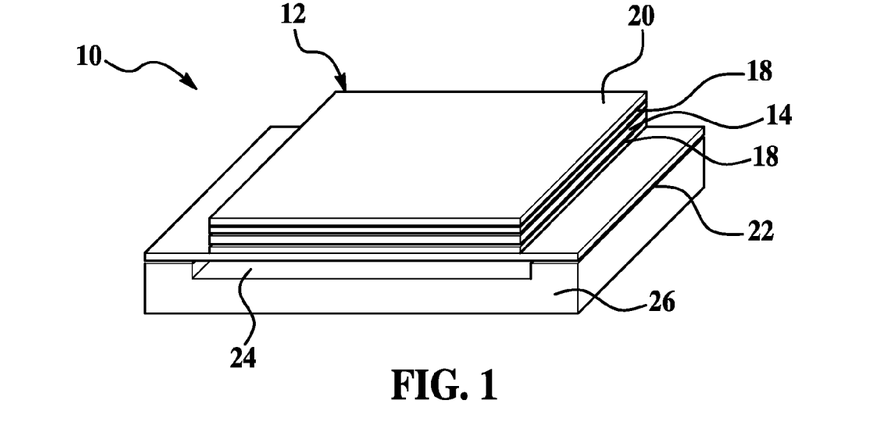
FIG. 1 is a perspective view of a sensing element.
Figure 2:
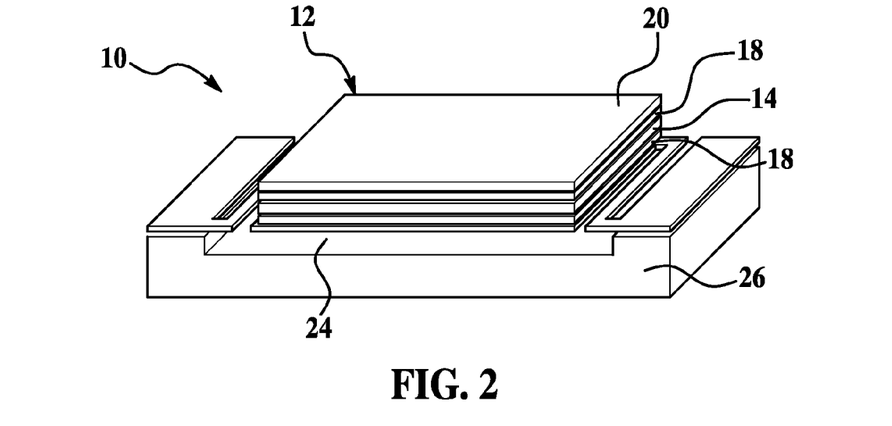
FIG. 2 is a perspective view of a sensing element having an increased lateral thermal path.

An exemplary embodiment of a thermal sensor or infrared sensor (e.g., photonic sensor) 10 is illustrated in FIGS. 1 and 2. In accordance with an exemplary embodiment sensor 10 will comprise at least one thermal sensing element or infrared sensor (e.g., photonic sensor) 12. In accordance with an exemplary embodiment, thermal sensing element comprises a ferroelectric material or film 14 located between a pair of electrodes 18 (e.g., platinum electrodes or any other suitable material). In addition, an overlying absorber layer or layer 20 is disposed on an upper electrode 18. As is known in the related arts layer 20 will provide a means for allowing radiation to pass therethrough and heat up ferroelectric material or film 14 wherein a surface electrical charge is generated. One non-limiting example of the ferroelectric material contemplated is a pyroelectric sensing material comprising a Strontium-Bismuth-Tantalate compound ($SrBi_2Ta_2O_9$) of course other equivalent materials are considered to be within the scope of the present invention.

Electrodes 18 are electrically coupled to a circuit for measuring the voltage signal generated in the crystalline material of the ferroelectric material. One non-limiting example of such a circuit comprises a field effect transistor (FET) coupled to the electrodes, an amplifier and a comparator in order to provide an output indicative of the amount of radiation being passed onto the surface of the ferroelectric material. In one non-limiting example electrodes 18 are thought of plates of a capacitor wherein the change caused by the pyroelectric sensing material disposed between the plates of the capacitor is detected. Accordingly, the ferroelectric material or film, in addition to the platinum electrodes and overlying absorber layer or layers 20 comprise the active sensor element 12.

In accordance with an exemplary embodiment, an additional dielectric layer of silicon nitride or other equivalent material 22 is provided in a cantilevered (FIG. 6) or membrane configuration (FIG. 1) to support the sensing films of element 12 above a gap 24 that separates the sensing films of element 12 from the underlying substrate, which typically represents a heatsink 26. As discussed above, this gap helps to reduce the thermal conductance between the substrate material below and a lower portion of the sensing element. In addition, the configuration of layer 22 in FIG. 2 increases the length and resistance of a lateral path for heat conductance thereby further reducing the thermal conductance of the sensing element (e.g., serpentine configuration). In this configuration a single extended path is provided from one end of the sensing element to the substrate (FIG. 6) or at least a pair of paths to the periphery of the gap 24 (FIGS. 1-5). A non-limiting example of a suitable heatsink material is the silicon of the chip substrate, wherein the high thermal conductivity of silicon allows it (i.e., the chip substrate) to serve essentially as a heat sink. Of course, the chip substrate could also be augmented with metallic layers or structures, or even thermoelectric or other active cooling implementations, in order to further adjust the background or "heatsink" temperature.

It is also contemplated that surface and/or bulk micromachining can produce released structures such as membranes and cantilevered elements that are suitable for other sensing applications. These elements can be formed in a manner such that they are not in physical contact with underlying material layers over some fraction of their extent. Such released structures have been used to form accelerometers, gyroscopes, pressure sensors, and other useful structures. They have also been used as the basis for various optical components, including arrays of mirrors and arrays of diffraction gratings.

Figure 3:
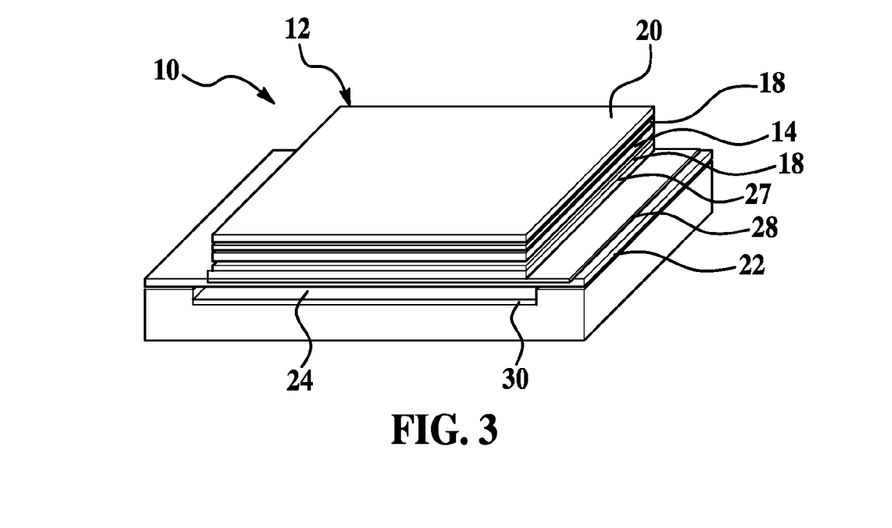
FIG. 3 is a perspective view of a sensing element constructed in accordance with an exemplary embodiment of the present invention.
Figure 10:
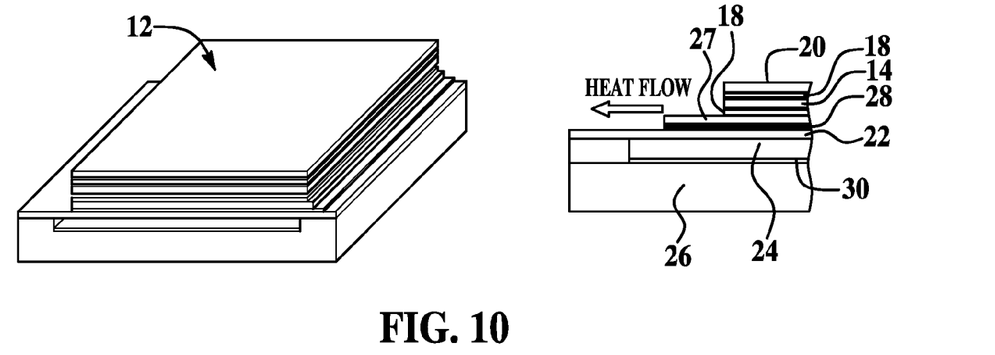
FIGS. 10 and 11 illustrate thermal paths of exemplary embodiments of the present invention.

Referring now to FIG. 3 and in accordance with an exemplary embodiment, an upper switching electrode 28 is disposed between layer 22 and the sensing element 12. In addition, a lower switching electrode 30 is disposed between the substrate 26 and the thermal gap 24, which is located between layer 22 and electrode 30. Thus, the configurations of FIGS. 1 and 2 or other alternative configurations are provided with electrodes 28 and 30. A non-limiting example of a material for electrodes 28 and 30 is platinum, which is also a suitable material for the contacting elements of the thermal sensing structure itself Other integrated circuit (IC) compatible conductive materials are also acceptable for use in the electrodes 28 and 30, including for example aluminum, doped polycrystalline silicon, and titanium/tungsten alloys. Alternatively, electrode 28 may also serve as the electrode for the sensing element or the sensing element may comprise separate electrodes necessary for operation of the sensing element in the latter embodiment, an insulating layer 27 (e.g., $Si_3N_4$) is disposed between electrode 28 and electrode 18 of sensing element 12. It is also noted that these electrodes (e.g., 18 and 28) may also provide lateral paths of thermal conductance (See FIGS. 10 and 11).

Figure 11:
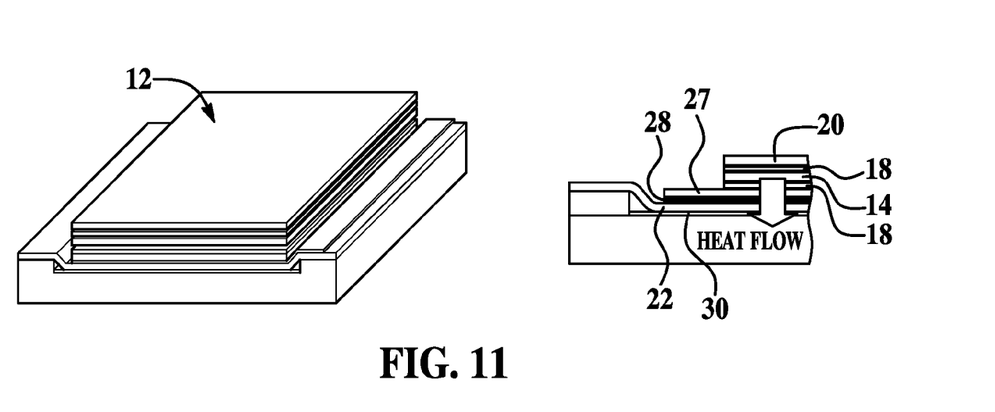
Figure 12:
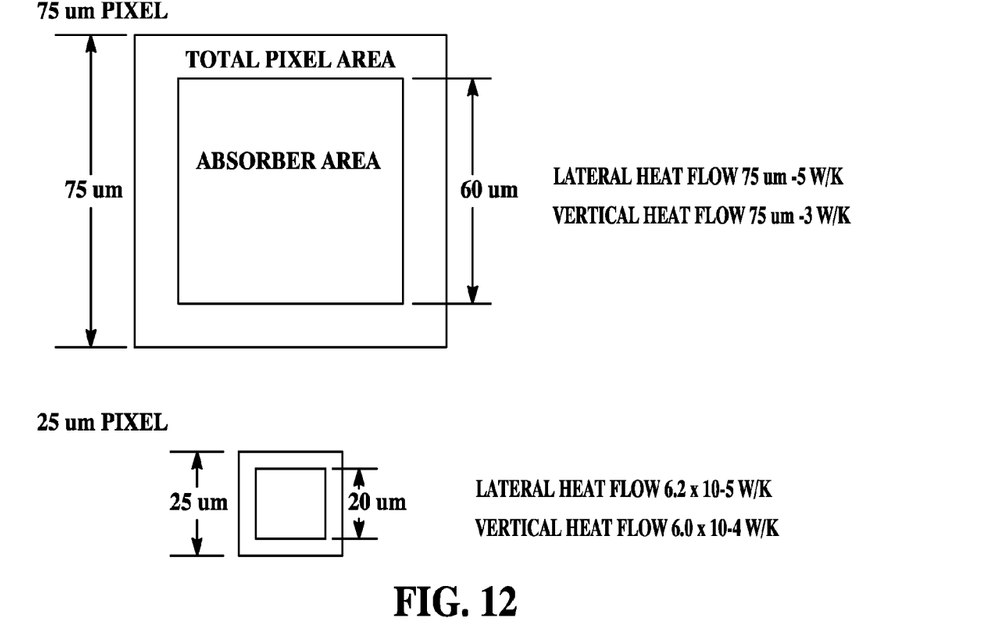
FIG. 12 illustrates relative heat flows of sensing elements.
Figure 13:
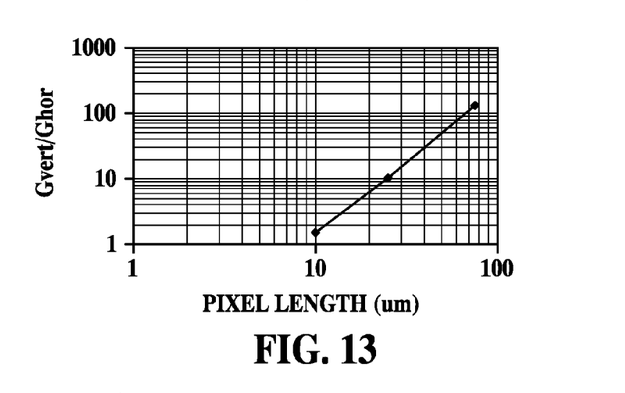
FIG. 13 is a graph illustrating heat flow trends with respect to pixel size.

In operation, the lower switching electrode is provided with a voltage relative to the upper switching electrode (e.g., positive to negative), which attracts the upper switching electrode downward, wherein the gap between the electrodes is removed and a path for thermal conductivity is now provided. In this respect, as shown in FIG. 11, the dielectric layer 22 contacts the electrode 30. In a given implementation the "thermal conductance gap" may in fact be comprised of a partial or complete vacuum as air in the gap may increase the conductance of the "thermal conductance gap". In this embodiment, the thermal imaging system, array or infrared sensor are packaged in a vacuum enclosure or environment. In yet another alternative, at least the thermal conductance gap is packaged in a vacuum enclosure or environment. Accordingly, element 28 and layer 22 comprise material capable of being deflected downward and attracted to electrode 30 when a voltage is applied. Furthermore, element 28 and layer 22 comprise materials capable of returning to their un-deflected position when the voltage is no longer applied. In addition, it is noted that since electrodes 18 are required to be electrically connected to a measuring circuit (e.g., travel onto at least a portion of the periphery of the substrate supporting element 12) their effect on this rate of deflection and return is either negligible or accounted for. For example, electrodes 18 and layer 27 will travel to a measuring circuit. It is noted that in one embodiment electrodes 18 will be insulated from each other as well as electrode 28 this may be achieved through layer 27 and spaced paths of electrodes 18 to the measuring circuit. In yet another alternative and as discussed herein electrode 28 and the lower electrode 18 may be combined to provide the dual feature of measuring the change in the ferroelectric material or film as well as providing the increased thermal conductance path to substrate 26 through electrode 30.

Exemplary embodiments of the present invention relate to thermal imaging devices, and the use of techniques to modulate or change the thermal path between the sensor elements and the surrounding ambient in a known and useful manner, wherein the modulation of the sensor increases the sensitivity of the sensor by lowering the thermal conductivity between the sensor element and a heat sink or alternatively increasing the response speed of the sensor by increasing the thermal conductivity between the sensor element and the heat sink. Accordingly, exemplary embodiments of the present invention enhance the ability of the sensor elements to detect infrared radiation and variations therein.

By providing an additional path for heat transfer away from the infrared sensitive region of the sensor element exemplary embodiments of the present invention can decrease the amount of time that is required for the sensor element to return to a relative state of thermal equilibrium with its substrate after performing a measurement of the incoming infrared radiation, and consequently increase the rate at which the sensor can respond to changes in incident radiation (i.e. the "frame rate of an imager array). Unfortunately, such an increased thermal conductivity from the active sensor region to a heatsink can also reduce the magnitude of the response of the sensor to incoming radiation and increase the time required to determine an accurate measurement of the incoming radiation, neither of which is desirable.

The present invention teaches the implementation of a switchable thermal conduction path from the active sensor region to a suitable heatsink. Conceptually, the switching function may be implemented by adding two conductive layers (28 and 30) and a dielectric insulating layer (27) to the active sensor structure shown in FIGS. 1 and 2 or other alternative configurations. One resulting concept is shown in FIG. 3. For simplicity the example shown represents a simple addition of the elements of the infrared sensor element (the absorber layer, metal layers, ferroelectric layers, and underlying dielectric layer) to the elements that could be used to implement a deformable membrane structure comprising an upper metallic switching electrode, a dielectric layer, for example silicon nitride, and on the substrate beneath the compound sensor structure, a lower electrode structure. It is to be expected that the functions of some of these layers could be combined; for example, the bottom metallic electrode of the active sensor element could also serve as the upper electrode of the addressing structure. Thus, FIG. 3 is intended to represent the concept of augmenting the active sensor structure with the means necessary to effect a change in its physical position or configuration; it represents one of many possible implementations of this concept.

Figure 4:
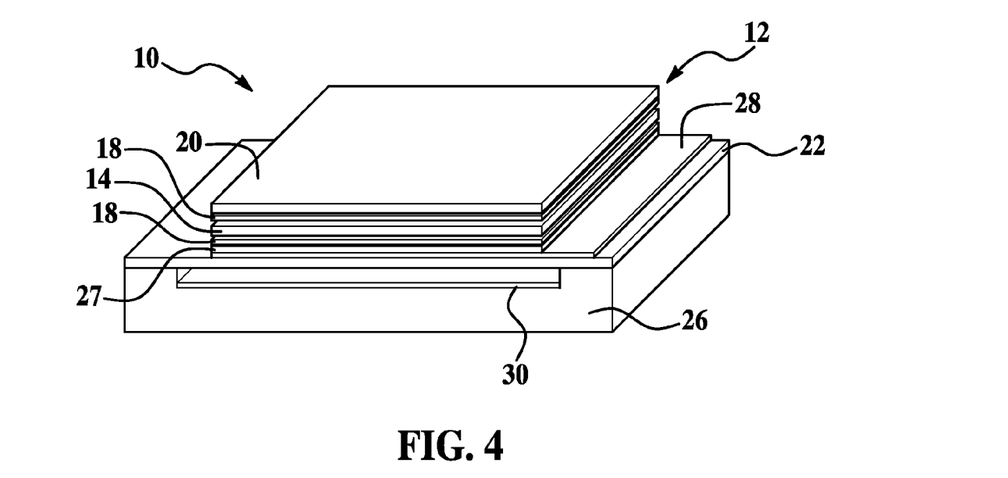
FIG. 4 is a perspective view of a sensing element constructed in accordance with an exemplary embodiment of the present invention in a low thermal conductance state.

According to this concept and during the measurement process, the only thermal conductance path between the active sensor region and the heatsink is through conduction laterally across the membrane or cantilever structure, which may have an extended path as shown in FIG. 2. In general, this path can be made relatively long, with the result that the thermal conductance away from the active sensor is relatively small. Also and according to exemplary embodiments of the present invention, when it is desirable to increase the thermal conductance path between the active sensor area and surrounding regions the physical geometry of the sensor is altered in order to significantly increase the thermal conductance between the active sensor and the surrounding regions. One example of such an implementation is shown in FIG. 4 (e.g., the application of a voltage to the electrodes to reduce the thermal conductance path between the sensor element and the heat sink).

Figure 5:
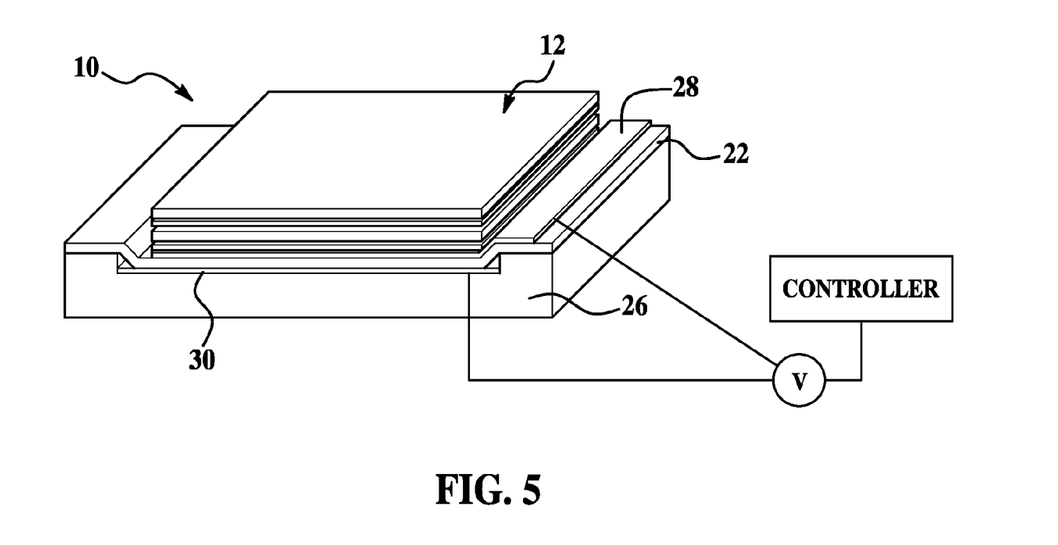
FIG. 5 is a perspective view of a sensing element constructed in accordance with an exemplary embodiment of the present invention in a high thermal conductance state.

During the sensing process, the active sensor element is suspended upon a membrane or cantilever structure above the surface of the image sensor substrate, such that the only thermal conduction path is predominantly lateral. Upon the application of a suitable voltage between one of the electrode elements of the sensor structure and an electrode in the underlying substrate region, the membrane or cantilever structure is pulled down to minimize the extent of the physical gap between the membrane or cantilever structure and the underlying substrate (FIG. 5). Reference is made to U.S. Pat. Nos. 5,933,277 and 5,953,161, the contents of which are incorporated herein by reference thereto, wherein methods and apparatus for deflecting items in an imaging system using an applied voltage is disclosed.

In a particular embodiment, this may involve physical contact between the membrane or cantilever structure and the underlying substrate. With the reduction in extent of the physical gap between the active sensing structure and the underlying substrate (or the establishment of physical contact between these two elements) the thermal conduction path between the active sensing element and the surrounding region (in particular, the substrate) is significantly increased. After a suitable period during which the active sensing structure has "cooled down", the applied voltage is removed and the physical gap between the active sensing element and the underlying substrate is reestablished, with the result that the vertical thermal conduction path is again minimized, and the sensor is again ready to detect radiation, having a relatively small thermal conductivity, predominantly in the lateral direction, to its surroundings. In accordance with an exemplary embodiment, a voltage is applied between electrodes 28 or 30 at a frequency in order to provide a modulation to the sensing element such that the sensing element is provided with a larger thermal conductive path at a known frequency wherein the sensor is capable of filtering out background radiation (e.g., noise). Alternatively, the application of the voltage is applied to periodically provide a thermal conductance path for the sensor (e.g., periodic "cooling" of the thermal sensor). It is also understood that the modulation technique of exemplary embodiments of the present invention are applicable to an array of sensors or a single sensing element.

In addition to the above-mentioned formation of the sensor elements upon cantilever or membrane structures, and in order to minimize thermal conduction to the underlying substrate, it is generally taught that decreasing the lateral thermal conductance to the surrounding heatsink is also advantageous. This can be accomplished by reducing the cross sectional area of those films that connect the active sensing region to the surrounding heatsink region. Additionally, increasing the physical length of the thermally conducting path between the active sensor area and the surrounding region is also advantageous, as suggested by FIG. 2.

In order to obtain a qualitative understanding of the differences in thermal conductivity that may be obtained according to exemplary embodiments of this invention, consider the simplified example shown in FIG. 6, along with the following calculations.

Figures 6A, 6B, 6C:
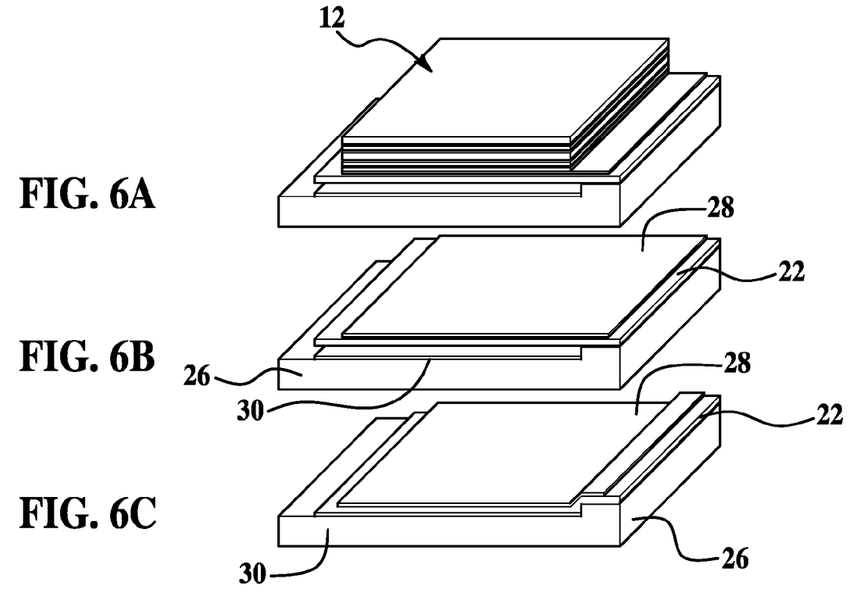
FIG. 6 are partial perspective views of a sensing element constructed in accordance with an exemplary embodiment of the present invention.

Consider a cantilevered active sensor element as shown in FIG. 6(a). For this example, the only lateral thermal conductivity path is through the cantilever arm, and is comprised of metallic and insulator layers. FIG. 6(b) shows these two layers, which are the appropriate layers that enter into the approximation calculation of lateral and vertical thermal conductivity from the overlying active sensor element, which is not shown. FIG. 6(c) shows the cantilevered element in the deflected position, following the application of a suitable activation voltage.

Assume that the width of the cantilever element is 25 micrometers, its length is 25 micrometers, the thickness of the upper layer (metal electrode, assume platinum) 0.2 micrometers, and the thickness of the lower layer (dielectric, assume silicon nitride) is 0.3 micrometers. Further, assume that the thermal conductivity of the metal layer is 71.6 W/mK and that of the insulator layer is 3.7 W/mK. Also, in order to allow a simple approximation, assume that the heat source for the lateral conductance calculation is essentially localized at a distance of 12.5 micrometers from the edge of the cantilever although the heat source should be represented as a distributed source along the entire length of the cantilever. With these assumptions, the lateral thermal conduction is given by the product of the thermal conductivity; the thickness and the lateral extent of each film layer, divided in each case by the distance to the heat sink, assumed to be 12.5 micrometers. The resultant thermal conductivity is given approximately by (since the thermal conductivity of the metal layer is much higher than that of the dielectric layer, we may essentially neglect the dielectric layer in this simple evaluation):

$$G(\text{lateral}) = (k*d*W)/L = (71.6 \text{ W/mK} * 0.2 \times 10^{-6} \text{ m} * 25 \times 10^{-6} \text{ m}/12.5 \times 10^{-6} \text{m})$$

or $$G(\text{lateral}) = 2.9 \times 10^{-5} \text{ W/K}.$$

Similarly, the thermal conductivity measured vertically through the cantilever structure, when the cantilever has been deflected into the high thermal conductivity state, is given approximately by two conductances in series:

$$G(\text{vertical-metal}) = (k*W*L)/d = (71.6 \text{ W/mK} * 25 \times 10^{-6} \text{ m} * 25 \times 10^{-6} \text{ m}/0.2 \times 10^{-6} \text{ m})$$

$$G(\text{vertical-metal}) = 0.22 \text{ W/K}$$

and $$G(\text{vertical-dielectric}) = (k*W*L)/d = (3.7 \text{ W/mK} * 25 \times 10^{-6} \text{ m} * 25 \times 10^{-6} \text{ m}/0.3 \times 10^{-6} \text{ m})$$

$$G(\text{vertical-dielectric}) = 7.7 \times 10^{-3} \text{ W/K}$$

The net vertical conductance is given by $$1/G(\text{vertical}) = 1/G(\text{vertical-metal}) + 1/G(\text{vertical-dielectric})$$

which yields $$G(\text{vertical}) = 7.4 \times 10^{-3} \text{ W/K}.$$

Thus, the ratio of the thermal conductance in the high conductance state to that in the low conductance state for this simple example is $$G(\text{ratio}) = (7.4 \times 10^{-3} \text{ W/K} + 2.9 \times 10^{-5} \text{ W/K})/2.9 \times 10^{-5} \text{ W/K} = 256:1$$

In this simple example, the thermal conductance between the active sensor element and the surrounding heatsink can be modulated by a factor of over 200.

Figure 7:
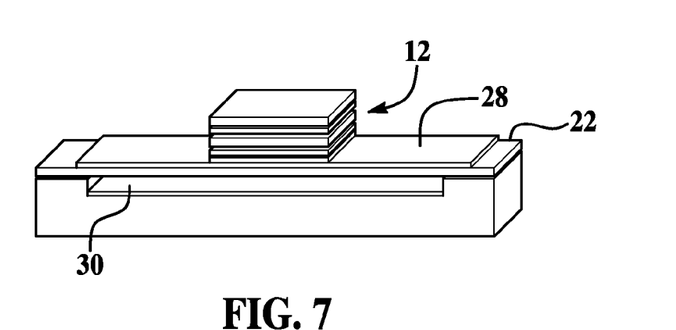
FIG. 7 is a perspective view of a sensing element constructed in accordance with an alternative exemplary embodiment of the present invention in a low thermal conductance state.
Figure 8:
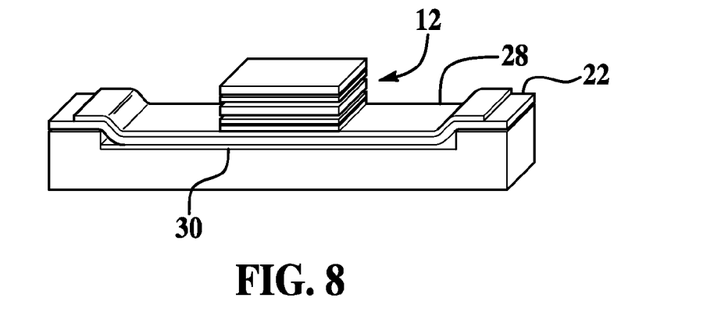
FIG. 8 is a perspective view of a sensing element constructed in accordance with an alternative exemplary embodiment of the present invention in a high thermal conductance state.

In combination with the above described implementation to significantly change thermal conduction paths between active infrared sensor elements and their surrounds or heatsinks, it is also envisioned that techniques for further reducing the lateral thermal conductivity between the active sensor element and the surrounding regions would be advantageous in order to further increase the magnitude of the difference in thermal conductivity between the high thermal conductivity state and the low thermal conductivity state. For example, as shown in FIG. 7, if sufficient physical space is available, it is possible to physically increase the length of the membrane or cantilever structure in the direction of the thermal conduction path so as to reduce the thermal conductivity. This may also be advantageous in that it serves to reduce the mechanical restoring forces that seek to keep the membrane or cantilever structure in its normal position, and thereby would tend to reduce the magnitude of the applied electrical potential that is required to deflect the membrane or cantilever into the high thermal conductivity (distorted) position (FIG. 8).

Figure 9:
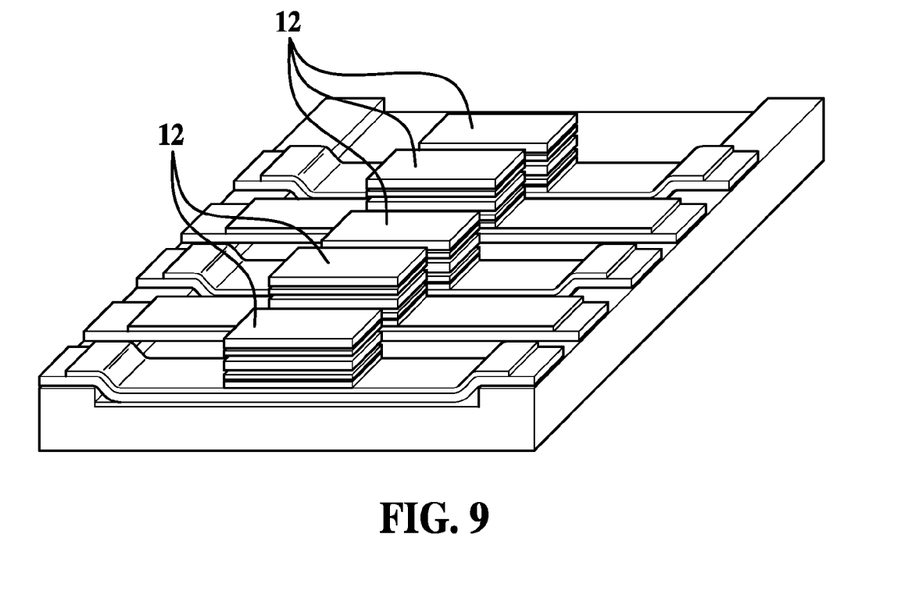
FIG. 9 is a perspective view of an alternative exemplary embodiment of the present invention.

Such an implementation would be of particular advantage in a single sensor element implementation, or in a 1-dimensional array implementation, as shown schematically in FIG. 9.

Figure 14:
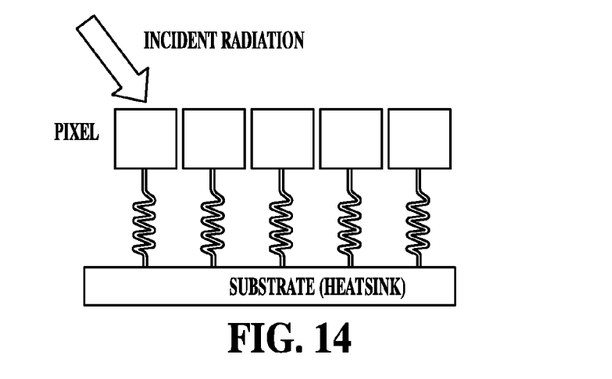
FIG. 14 is a schematic illustration of a sensing array constructed in accordance with an exemplary embodiment of the present invention.

As an alternative implementation, in which a first set of active sensor structures remain substantially at rest and a second set of membrane or cantilevered films is selectively brought into contact with the active sensor films through the mechanisms described above, it is possible to provide a sensor functionally equivalent to the above described implementations in terms of the modulation of the thermal conductance path away from the sensor element towards surrounding elements, including heatsinks. Potential advantages of such a "moving thermal reference" solution may include the reduction in stress-induced changes in the active sensor materials, and faster response because of lower thermal mass. Non-limiting examples are shown in FIGS. 9 and 14.

An additional exemplary embodiment is directed to the modulation of the thermal conductivity from a given sensor element to a reference substrate heat sink in a known repetitive manner to achieve the goal of modulating the photon detection performance of the sensor element (e.g., application of a voltage at a known frequency). This modulation of the thermal conductivity between the sensor element and a given substrate or reference thermal mass can enable the use of signal averaging techniques to effectively increase the sensitivity of the sensor element.

Figure 15:
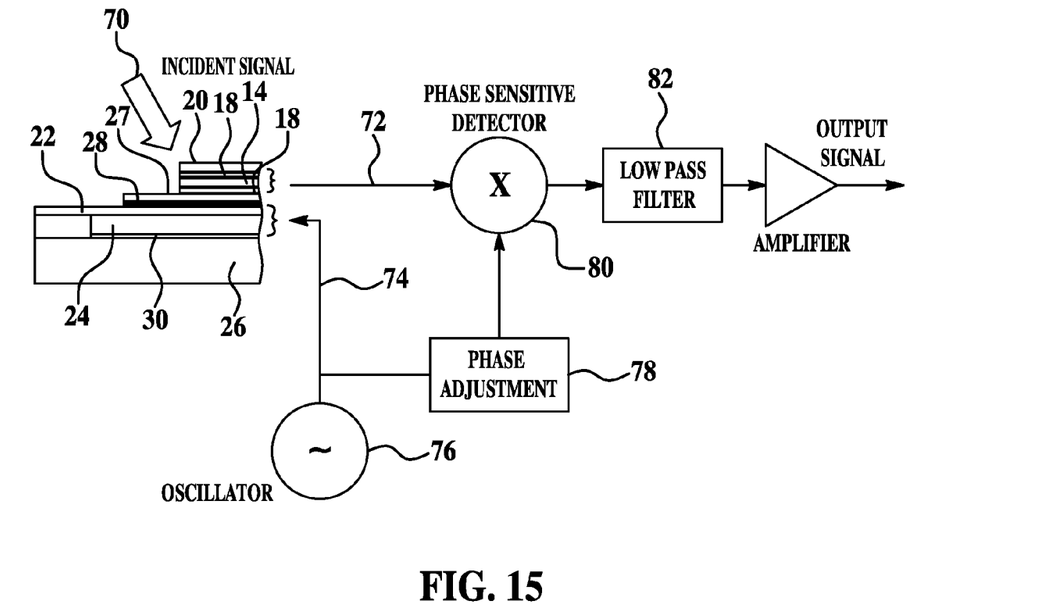
FIG. 15 is a schematic illustration of a sensing element device constructed in accordance with an alternative exemplary embodiment of the present invention.

One non-limiting example of this means to improve sensitivity of thermal sensing element is illustrated in FIG. 15 wherein a single sensing element is illustrated. However, and as discussed above this modulation may be applied to an array of elements or subsets thereof or to a single sensing element.

In this embodiment enhanced amplification of a signal relative to noise is provided using the technique of phase sensitive amplification. Referring now to FIG. 15 an incident signal is detected by the pyroelectric material 14 and is reported as a change in output signal (for example, an output voltage or signal 72 from the sensor element. During this sensing process, an alternating voltage 74 is applied between the electrode pair closest to the air gap (28, 30), which results in a periodic variation of the position of the sensor element relative to the underlying substrate. This driving voltage is applied by for example an oscillator 76, wherein the applied voltage is varied at a rate that is faster than the rate of variation of the signal being sensed by the sensor. This in turn results in a periodic variation in the thermal conductance between the sensor element and the substrate or heatsink which effectively modulates the signal output from the sensor element.

This output signal from the sensor element is detected by a phase sensitive detector 80. A simple form of phase sensitive detector is an analog multiplier, which multiplies the input signal by a reference signal derived from the signal that is driving the modulation of the sensor output signal (in general it may be necessary to adjust the phase of this reference signal using phase adjustment device 78).

The result of this process is a signal that combines the actual sensor output (which may be varying at a relatively lower frequency) and the relatively higher frequency components representative of the oscillator frequency. This combined signal is then amplified. The higher frequency components are removed by the use of a conventional low pass filter 82. Effectively this process amplifies the signal of interest, but does not amplify the noise associated with the signal measurement. The resulting output is an amplified signal representative of the response of the sensor element to the incident signal.

In such an implementation, the variation of the thermal conductivity need not be of as large a magnitude as would be beneficial in the previous embodiments (e.g., actual contact of the dielectric layer to the second electrode). For example, the sensing element may be moved only a portion of the distance between its rest position and the underlying substrate (e.g., non-contact but closer for increased thermal conductance); a degree of motion which might not be beneficial in the previously described implementations.

Figure 16:
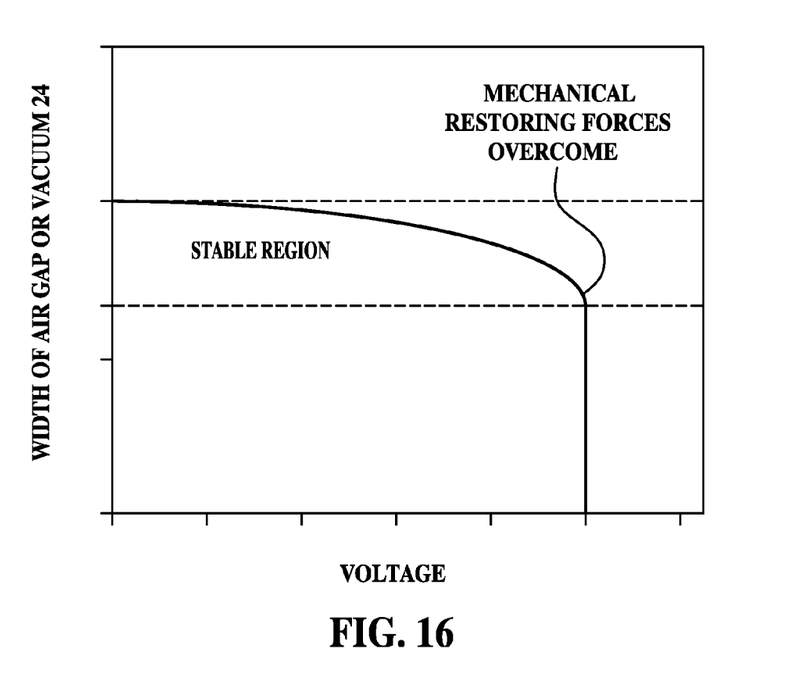
FIG. 16 is a graph illustrating the mechanical behavior of a sensing element device constructed in accordance with an alternative exemplary embodiment of the present invention.

Moreover, this range of movement which does not result in dielectric to electrode contact may be a stable region of separated electrodes wherein the mechanical restoring force of the electrode and dielectric layer is not completely overcome as the voltage is applied. One non-limiting example of such a stable region is illustrated in FIG. 16. Advantageously, such a mode of operation might not require contact between the sensing element and the underlying substrate, which has been known to complicate the design of such movable membrane structures due to the phenomenon known as stiction. Similarly, the rate of modulation may be faster than the rate of reading out the sensing element's temperature, such that many cycles of thermal conductivity variation may occur before the readout of the given sensing element is completed. The knowledge of the rate at which the thermal conductivity is varying, and the knowledge of the amount of change of thermal conductivity which is occurring, can enable the effective amplification and detection of the sensor element temperature measurements. It is envisioned that such a capability would be of additional benefit when an array of more than one sensing element is being measured.

In accordance with an exemplary embodiment, and referring to the arrays illustrated in FIGS. 9 and 14, varying of the thermal conductivity between each of sensor elements and its substrate or heatsink in a repetitive manner, which is not directly matched to the pixel readout cycle of the array offers additional benefits. Referring in particular to FIG. 14, the lateral thermal conductance paths are shown and the varying thermal gaps would be below the sensor elements or pixels of the array. For example, the signal to noise ratio can be improved by implementing a form of "phase sensitive or synchronous detection" which relies upon a periodic variation in the signal to be detected to which a single detector or array of detectors can by synchronized. In this embodiment, the variation in the magnitude of the thermal conductivity does not need to be as large as that provided from direct sensor element to heat sink contact. Accordingly, modulation can be performed without requiring the moving membrane to actually contact the substrate thereby potentially extending the lifetime of the memory materials being used for the electrodes and layer 22. Removing the need for contact would remove this potential lifetime concern for this approach.

In accordance with exemplary embodiments of the present invention, an electrically driven repositionable membrane electrode or cantilever structure to alternately increase and decrease the thermal conductance between a given element, for example a sensor element, and a second element, which for example may be a heatsink or substrate is provided. In any of the embodiments disclosed herein a controller or microprocessor (e.g., FIG. 5) with a control algorithm resident therein may comprise a plurality of executable steps, which in response to signals received will determine whether to apply a voltage to exemplary embodiments of the present invention, wherein the sensor elements are electrically driven to alternately increase and decrease the thermal conductance between the sensor element and a heatsink. Thus, numerous implementations are available (e.g., all sensors having an increased or decreased thermal conductance path or only portions of the sensors array having increased or decreased thermal conductance paths) for a given time period and depending on the particular application.

Further, exemplary embodiments of the present invention enable the modulation of the detection capability of an infrared sensor or sensor array through the controlled variation of the thermal conductance between the sensor elements, individually, and a known substrate or heatsink.

Further, exemplary embodiments of the present invention enable the relatively rapid equilibration of the temperature of a sensor element with that of a provided heatsink in a controlled manner such as to not adversely impact the ability of the sensor element to detect incident infrared radiation.

In accordance with exemplary embodiments of the present invention a sensing element or elements are provided that alternately may be activated into high thermal conductivity states and low thermal conductivity states in some appropriate temporal pattern.

Exemplary embodiments of the present invention enable a two dimensional array of sensing elements to be alternatively activated between high thermal conductivity states and lower thermal conductivity states either individually, in unison, or in some other advantageous temporal or physical pattern.

Exemplary embodiments of the present invention also enable a one dimensional array of sensing elements to be alternatively activated between high thermal conductivity states and lower thermal conductivity states either individually, in unison, or in some other advantageous temporal or physical pattern.

Exemplary embodiments of the present invention also reduce the thermal conductance between a given sensing element and adjacent sensing elements, heatsinks or other objects in order to increase the difference in thermal conductance between activated and un-activated states. Techniques to achieve such reductions in thermal conductivity through lateral paths include minimizing the cross sectional area of connecting film layers, segmenting film layers so that they are not continuous between elements, and by extending the length of connecting films.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An infrared sensor, comprising:
   a sensing element;
   a dielectric layer;

a first electrode disposed between the sensing element and the dielectric layer, the dielectric layer contacting only one side of the first electrode;

a second electrode positioned in a facing spaced relationship with respect to the dielectric layer, the second electrode being disposed upon a substrate; and wherein an applied voltage between the first and second electrodes attracts the first electrode towards the second electrode and the dielectric layer moves toward the second electrode, wherein a path of thermal conductance is provided between the substrate and the sensing element through the first electrode, the dielectric layer and the second electrode, and the dielectric layer and the first electrode return to the facing spaced relationship when the applied voltage is removed.

2. The infrared sensor as in claim 1, wherein the path of thermal conductance increases the sensing elements response to radiation.

3. The infrared sensor as in claim 1, further comprising a controller responsive to a plurality of signals, wherein the controller controls a voltage source and comprises an algorithm for determining whether to supply the voltage from the voltage source to the second electrode.

4. The infrared sensor as in claim 1, wherein the dielectric layer is configured to have an extended lateral path of thermal conductance between the sensing element and a portion of the substrate defining a cavity between the second electrode and the dielectric layer, wherein the elongated lateral path of thermal conductance increases the sensitivity of the sensing element.

5. The infrared sensor as in claim 1, wherein the dielectric layer has a periphery substantially larger than a periphery of the sensing element.

6. The infrared sensor as in claim 1, wherein the dielectric layer is configured to have a serpentine configuration.

7. The infrared sensor as in claim 6, wherein the first electrode is configured to have a serpentine configuration.

8. The infrared sensor as in claim 1, wherein the first electrode is configured to have an extended lateral path of thermal conductance and the infrared sensor further comprises an insulating layer disposed between an electrode of the sensing element and the first electrode.

9. The infrared sensor as in claim 1, wherein the first electrode has a periphery substantially larger than a periphery of the sensing element.

10. The infrared sensor as in claim 1, wherein the sensing element is a ferroelectric sensing element and the dielectric layer makes contact with the second electrode when the voltage is applied between the first and second electodes.

11. The infrared sensor as in claim 1, wherein the sensing element comprises a pyroelectric sensing material comprising a Strontium-Bismuth-Tantalate compound (SrBi2Ta2O9).

12. The infrared sensor as in claim 1, wherein the sensing element is a pyroelectric sensing element and the infrared sensor further comprises a controller responsive to a plurality of signals, wherein the controller controls a voltage source and comprises an algorithm for determining whether to supply the voltage from the voltage source to the second electrode.

13. The infrared sensor as in claim 12, wherein the dielectric layer is configured to have an extended lateral path of thermal conductance.

14. The infrared sensor as in claim 13, wherein the dielectric layer has a periphery substantially larger than a periphery of the sensing element and the dielectric layer is configured to have a serpentine configuration.

15. The infrared sensor as in claim 1, wherein the first and second electrodes are in a vacuum.

16. The infrared sensor as in claim 1, wherein the sensing element comprises an absorber layer, a first sensing element electrode, a pyroelectric sensing material and a second sensing element electrode, wherein the second sensing element electrode is disposed on the dielectric layer.

17. A sensing array, comprising a plurality of sensing elements each sensing element, comprising:
 a dielectric layer;
 a first electrode disposed between the sensing element and the dielectric layer, the dielectric layer contacting only one side of the first electrode;
 a second electrode positioned in a facing spaced relationship with respect to the dielectric layer, the second electrode being disposed within a receiving area defined by a substrate, wherein a portion of the dielectric layer is supported by a periphery of the receiving area; and
 wherein an applied voltage to the second electrode attracts the first electrode towards the second electrode and the dielectric layer moves toward the second electrode, wherein a path of thermal conductance is provided between the substrate and the sensing element through the first electrode, wherein the first electrode and the dielectric layer return to the facing spaced relationship when the applied voltage is removed from the second electrode, wherein the array is configured to allow each sensing element to independently be moved towards the substrate, wherein the path of thermal conductance increases the sensing elements response to radiation.

18. The sensing array as in claim 17, wherein each sensing element is a ferroelectric sensing element and the dielectric layer makes contact with the second electrode when the voltage is applied between the first and second electrodes and the sensing element comprises a pyroelectric sensing material comprising a Strontium-Bismuth-Tantalate compound (SrBi2Ta2O9) and the infrared sensor further comprises an insulating layer disposed between an electrode of the sensing element and the first electrode.

19. The sensing array as in claim 17, wherein each sensing element comprises an absorber layer, a first sensing element electrode, a pyroelectric sensing material and a second sensing element electrode, wherein the second sensing element electrode is disposed on the dielectric layer.

20. A method of providing an intermittent thermal conductance path in an infrared sensor, comprising:
 disposing a sensing element on a first electrode, the first electrode being positioned on a dielectric layer, the dielectric layer contacting only one side of the first electrode;
 disposing a second electrode within a receiving area defined by a substrate, wherein a portion of the dielectric layer is supported by a periphery of the receiving area, wherein the second electrode is positioned in a facing spaced relationship with respect to the dielectric layer; and
 providing a thermal conductance path from the sensing element to the substrate by applying a voltage to the second electrode, wherein the first electrode is pulled towards the second electrode and wherein the first electrode and the dielectric layer return to the facing spaced relationship when the applied voltage is removed from the second electrode.

21. The method as in claim 20, wherein the voltage is modulated at a constant frequency to provide a desired sensitivity to the infrared sensor.

22. The method as in claim 21, wherein the intermittent thermal conductance path is provided by moving the first electrode and the dielectric layer within a stable region wherein a mechanical restoring force of the first electrode and the dielectric layer is not completely overcome as the voltage is applied and the intermittent thermal conductance path increases the sensing elements response to radiation.

23. The method as in claim 20, wherein the dielectric layer is configured to have an extended lateral path of thermal conductance between the sensing element and a portion of the substrate defining the receiving area, wherein the elongated lateral path of thermal conductance increases the sensitivity of the sensing element.

24. A method for providing an intermittent thermal conductance path in a thermal sensing array, the method comprising:
   disposing a plurality of sensing elements on a plurality of first electrodes, the plurality of first electrodes each being positioned on a respective one of a plurality of dielectric layers, each of the dielectric layers contacting only one side of a respective one of the plurality of first electrodes;
   disposing each of a plurality of second electrodes within a receiving area defined by a substrate, wherein a portion of each of the plurality of dielectric layers is supported by a periphery of the receiving area, wherein the plurality of second electrodes are positioned in a facing spaced relationship with respect to a respective one of the plurality of dielectric layers; and
   intermittingly providing an increased thermal conductance path between a first portion of the plurality of sensing elements and the substrate and a second portion of the plurality of sensing elements and the substrate, wherein the increased thermal conductance path between the first portion of the plurality of sensing elements and the substrate is provided through a first portion of the plurality of second electrodes by changing a voltage drop between a first portion of the plurality of first electrodes and the first portion of the plurality of second electrodes, wherein a distance between the first portion of the plurality of first electrodes and the first portion of the plurality of second electrodes decreases; and
   wherein the increased thermal conductance path between the second portion of the plurality of sensing elements and the substrate is provided through a second portion of the plurality of second electrodes by changing a voltage drop between a second portion of the plurality of first electrodes and the second portion of the plurality of second electrodes, wherein a distance between the second portion of the plurality of first electrodes and the second portion of the plurality of second electrodes decreases.

25. The method as in claim 24, wherein the voltage drop is modulated at a constant frequency to provide a desired sensitivity to the thermal sensing array.

26. The method as in claim 24, wherein the substrate is configured to define a plurality of receiving areas, wherein a respective one of each of the plurality of second electrodes is received in the plurality of receiving areas.

27. The method as in claim 24, wherein the increased thermal conductance path between the first portion of the plurality of sensing elements and the substrate and the second portion of the plurality of sensing elements and the substrate is provided without the plurality of dielectric layers making contact with the plurality of second electrodes.

* * * * *